United States Patent
Kim

(10) Patent No.: US 8,982,968 B2
(45) Date of Patent: Mar. 17, 2015

(54) APPARATUS FOR CONVERTING TERMINAL POLARITY FOR R S COMMUNICATION

(71) Applicant: LSIS Co., Ltd., Anyang-si, Gyeonggi-do (KR)

(72) Inventor: Hyung Lae Kim, Pyeongtaek-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/092,109

(22) Filed: Nov. 27, 2013

(65) Prior Publication Data

US 2014/0192905 A1     Jul. 10, 2014

(30) Foreign Application Priority Data

Jan. 4, 2013    (KR) ................. 10-2013-0000933

(51) Int. Cl.
*H04B 3/00*      (2006.01)
*H04B 3/02*      (2006.01)

(52) U.S. Cl.
CPC ........................................ *H04B 3/02* (2013.01)
USPC ........................................................ 375/257

(58) Field of Classification Search
CPC ........................................................ H04B 3/02
USPC ........................................................ 375/257
See application file for complete search history.

(56) References Cited

U.S. PATENT DOCUMENTS 6,466,989 B1 * 10/2002 Chu ............................ 709/250
RE39,446 E * 12/2006 Winch et al. ................... 361/82

* cited by examiner

*Primary Examiner* — Kevin M Burd
(74) *Attorney, Agent, or Firm* — Lee, Hong, Degerman, Kang & Waimey

(57) ABSTRACT

An apparatus for converting terminal polarity for RS communication includes a comparator configured to discriminate polarities of a first signal line and a second signal line by comparing voltage levels indicated on the first and second signal lines of a cable for RS-485 communication, a switch unit configured to connect a TRXD+ terminal to the first signal line and connect a TRXD− terminal to the second signal line, or to connect a TRXD+ terminal to the second signal line or connect a TRXD− terminal to the first signal line in response to a provided switch control signal, and a switch controller configured to transmit the switch control signal to the switch unit in response to a polarity discrimination result by the comparator relative to the first signal line and the second signal line.

5 Claims, 6 Drawing Sheets

APPARATUS FOR CONVERTING TERMINAL POLARITY FOR R S COMMUNICATION

CROSS-REFERENCE TO RELATED APPLICATION

Pursuant to 35 U.S.C. §119(a), this application claims the benefit of earlier filing date and right of priority to Korean Patent Application No. 10-2013-0000933, filed on Jan. 4, 2013, the contents of which are hereby incorporated by reference herein in their entirety.

BACKGROUND OF THE INVENTION

1. Field of the Invention

Exemplary aspects of the present disclosure relate to an apparatus for converting terminal polarity for RS communication, and more particularly to an apparatus for converting a terminal polarity for RS communication configured to automatically convert terminal polarities by analyzing voltage levels of signals, even if communication cables are wired regardless of polarities of terminals.

2. Description of Related Art

RS-485, one of well known serial digital communication systems, is widely used in various fields due to being of fast speed and robust to noise. For example, the RS-485 communication system is widely used for data transmission among control devices in a PLC (Programmable Logic Controller) system. The RS-485 communication uses a differential signal and two signal lines TRXD+ and TRXD−, such that RS-485 communication terminals and cables must be connected with same polarities.

However, wiring errors frequently occur when a network is set up in a complicated system where various devices are mutually connected. If polarities are erroneously connected during wiring works, communication cannot be realized. Particularly, when the RS-485 communication is used for industries, it takes many hours to check wirings, because network scopes are broad, and the system is complicated.

SUMMARY OF THE INVENTION

Exemplary aspects of the present disclosure are to substantially solve at least the above problems and/or disadvantages and to provide at least the advantages as mentioned below. Thus, the present disclosure is directed to provide an apparatus for converting terminal polarity for RS communication configured to automatically convert terminal polarities of a device, even if cable polarities are erroneously connected when cables are connected for RS-485 communication, whereby a normal communication can be realized.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an apparatus for converting terminal polarity for RS communication, the apparatus comprising:

a comparator configured to discriminate polarities of a first signal line and a second signal line by comparing voltage levels indicated on the first and second signal lines of a cable for RS-485 communication;

a switch unit configured to connect a TRXD+ terminal to the first signal line and connect a TRXD− terminal to the second signal line, or to connect a TRXD+ terminal to the second signal line or connect a TRXD− terminal to the first signal line in response to a provided switch control signal; and a switch controller configured to transmit the switch control signal to the switch unit in response to a polarity discrimination result by the comparator relative to the first signal line and the second signal line.

Preferably, but not necessarily, the comparator may discriminate the polarity of the first signal line and the polarity of the second signal line using output voltages relative to the first signal line and the second signal line applied to an input terminal of mutually different polarities.

Preferably, but not necessarily, the comparator may include a first comparator configured to receive a voltage of the first signal line and a voltage of the second signal line through a minus input terminal and a plus input terminal respectively to discriminate the polarity of the first signal line and the polarity of the second signal line and to output a signal as a result of the discrimination, and a second comparator configured to receive a voltage of the first signal line and a voltage of the second signal line through a plus input terminal and a minus input terminal respectively to discriminate the polarity of the first signal line and the polarity of the second signal line and to output a signal as a result of the discrimination.

Preferably, but not necessarily, the switch unit may include a first D flip flop, a second D flip flop, a first AND element, a second AND element and an OR element, wherein two input terminals of the first AND element are respectively connected to an output terminal of the first comparator and to a Q' terminal of the second D flip flop, two input terminals of the second AND element are respectively connected to an output terminal of the second comparator and to a Q' terminal of the first D flip flop, a reset signal from a host is inputted to a RESET terminal of the first D flip flop, and a SET terminal is connected to an output terminal of the first AND element, a reset signal from the host is inputted to a RESET terminal of the second D flip flop, and a SET terminal is connected to an output terminal of the OR element, an output signal of the second AND element and a Q terminal signal-inversed signal of the first D flip flop are inputted to two input terminal of the OR element, and the switch control signal is generated by using a Q terminal signal of the first D flip flop and a Q terminal signal of the second D flip flop.

Preferably, but not necessarily, the switch unit may include a first switch configured to connect the TRXD+ terminal to the first signal line or disconnect the TRXD+ terminal from the first signal line, a second switch unit configured to connect the TRXD+ terminal to the second signal line or disconnect the TRXD+ terminal from the second signal line, a third switch configured to connect the TRXD− terminal to the second signal line or disconnect the TRXD− terminal from the second signal line, and a fourth switch unit configured to connect the TRXD− terminal to the first signal line or disconnect the TRXD− terminal from the first signal line.

Preferably, but not necessarily, the first, second, third and fourth switch units may be turned on when an inputted switch control signal is high, and the first, second, third and fourth switch units may be turned off when an inputted switch control signal is low.

Preferably, but not necessarily, the switch controller may reverse the Q terminal signal of the first D flip flop for transmission as control signals of the first switch and the second switch, and may reverse the Q terminal signal of the second D flip flop for transmission as control signals of the second switch and the second switch.

In an advantageous effect of the apparatus for converting a terminal polarity for RS communication according to the exemplary embodiment of the present disclosure, terminal polarities are automatically converted to enable a communication, even if polarities of a cable are erroneously connected to terminals of a device using a RS-485 communication, and the converted terminal polarities are maintained until a power of the device is turned off or reset.

Another advantageous effect is that the terminal polarities are automatically converted by analyzing the polarities of cable again, even if the power is switched or reset from an OFF state to an ON state in the midst of device operation, to thereby prevent problems caused by erroneous wiring under any circumstances.

Hence, a network scope is broad, and a swift wiring operation can be performed without any burden to polarity, even if a system has a complicated wiring appliance.

BRIEF DESCRIPTION OF THE DRAWINGS

The present disclosure may best be understood by reference to the following description taken in conjunction with the accompanying drawings, in which.

DETAILED DESCRIPTION OF PREFERRED EMBODIMENTS

Now, exemplary embodiments of the present disclosure will be described in detail with reference to the accompanying drawings. The present disclosure is herein described, by way of example only, with reference to the accompanying drawings. The present disclosure is presented in the cause of providing what is believed to be the most useful and readily understood description of the principles and conceptual aspects of the disclosure. In this regard, no attempt is made to show structural details of the disclosure in more detail than is necessary for a fundamental understanding of the disclosure and the description is taken with the drawings making apparent to those skilled in the art how the several forms of the disclosure may be embodied in practice.

Figure 1:
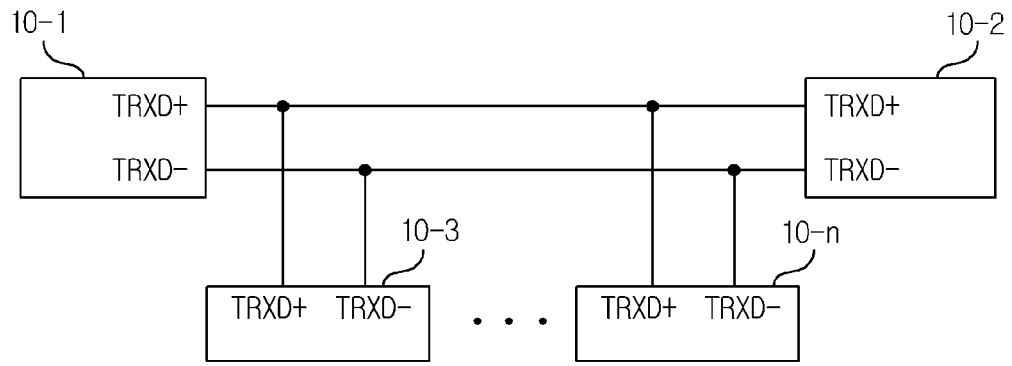
FIG. 1 is a block diagram illustrating a configuration in which devices configured to perform an RS-485 communication are connected in N:N method.

FIG. 1 is a block diagram illustrating a configuration in which devices (10-1~10-2) configured to perform an RS-485 communication are connected in N:N method, where each device (10-1~10-2) is configured to connect two terminals TRXD+ and TRXD− to a cable, and where RS-485 communication terminals of all devices are connected to cables having a same polarity. Any devices using the RS-485 communication may be used as a master or a slave.

Figure 2:
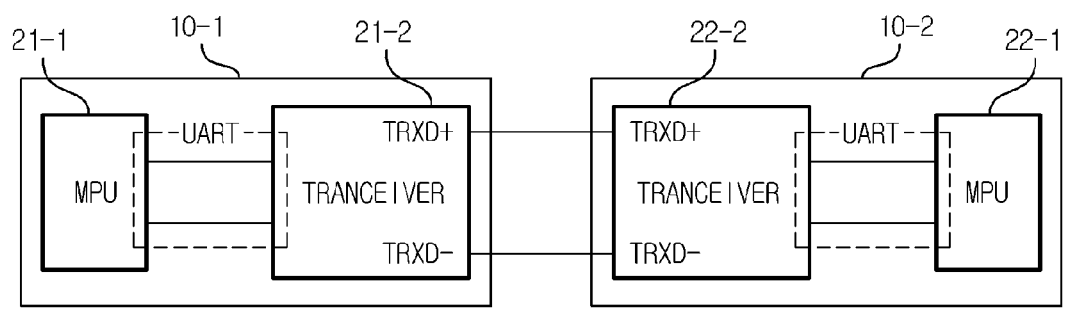
FIG. 2 is a block diagram illustrating a detailed connection configuration of the devices of FIG, 1.

FIG. 2 is a block diagram illustrating a detailed connection configuration of the devices of FIG. 1, where each device (10-1, 10-2) may include MPUs (Micro Processor Units, 21-1, 22-1) and transceivers (21-2, 22-2).

RS-485 transceivers are used for RS-485 communication, and the transceivers (21-2, 22-2) illustrated in FIG. 2 serve to transmit data by converting the data to differential signals or function to receive differential signals and analyze the differential signals. Furthermore, the transceivers (21-2, 22-2) are configured in such a manner that cables must be connected to two terminals TRXD+ and TRXD−, and RS-485 communication terminals of each device (10-1, 10-2) must be connected to cables of same polarity.

Figure 3:
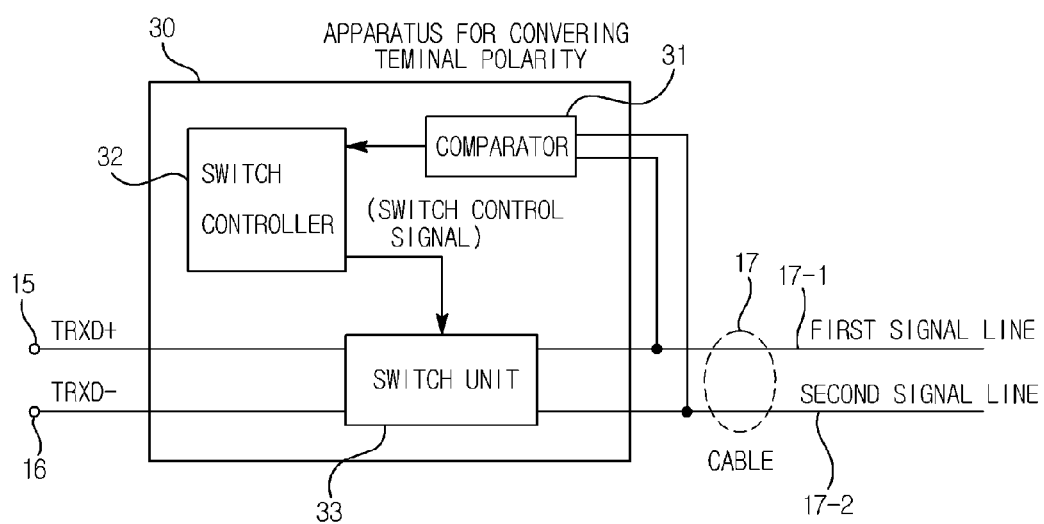
FIG. 3 is a block diagram illustrating an apparatus for converting a terminal polarity for RS communication according to the present disclosure.

FIG. 3 is a block diagram illustrating an apparatus for converting a terminal polarity for RS communication according to the present disclosure.

Referring to FIG. 3, the apparatus (30) for converting a terminal polarity for RS communication according to the present disclosure (hereinafter referred to as apparatus) serves to analyze voltage levels applied to each signal line (17-1, 17-2) of an RS-485 communication cable (17) and to automatically convert polarities of terminals.

For example, a TRXD+ terminal (15) illustrated in FIG. 3 must be connected to the first signal line (17-1), and even if the TRXD+ terminal (15) is connected to the second signal line (17-2), the apparatus (30) detects the wrong connection by itself, and connects the TRXD+ terminal (15) to the first signal line (17-1). The apparatus (30) may be variably applicable. For example, the apparatus (30) may be positioned between a transceiver and a communication cable.

The apparatus (30), as illustrated in FIG. 3, may include a comparator (31), a switch controller (32) and a switch unit (33). The comparator (31) discriminates polarities of the first and second signal lines (17-1, 17-2) by comparing voltage levels respectively generated from the first and second signal lines (17-1, 17-2) of the communication cable (17). The switch unit (33) connects the TRXD+ terminal (15) to any one of the first and second signal lines (17-1, 17-2) in response to a switch control signal transmitted by the switch controller (32), and connects a TRXD− terminal (16) to another signal line. The switch controller (32) transmits a switch control signal to the switch unit (33) in response to a result on the polarities of the first and second signal lines (17-1, 17-2) discriminated by the comparator (31), and maintains the terminal polarities discriminated by analyzing start bits and the like.

Because the received or transmitted signals are differential signals in the RS-485 communication, the switch controller (32) can discriminate whether the TRXD+ terminal (15) must be connected to the first signal line (17-1) or to the second signal line (17-2) and whether the TRXD− terminal (16) must be connected to the first signal line (17-1) or to the second signal line (17-2) in response to the result on the polarities of the first and second signal lines (17-1, 17-2) discriminated by the comparator (31), and can provide a switching control signal to the switch unit (33) based on the discrimination result.

Figure 4:
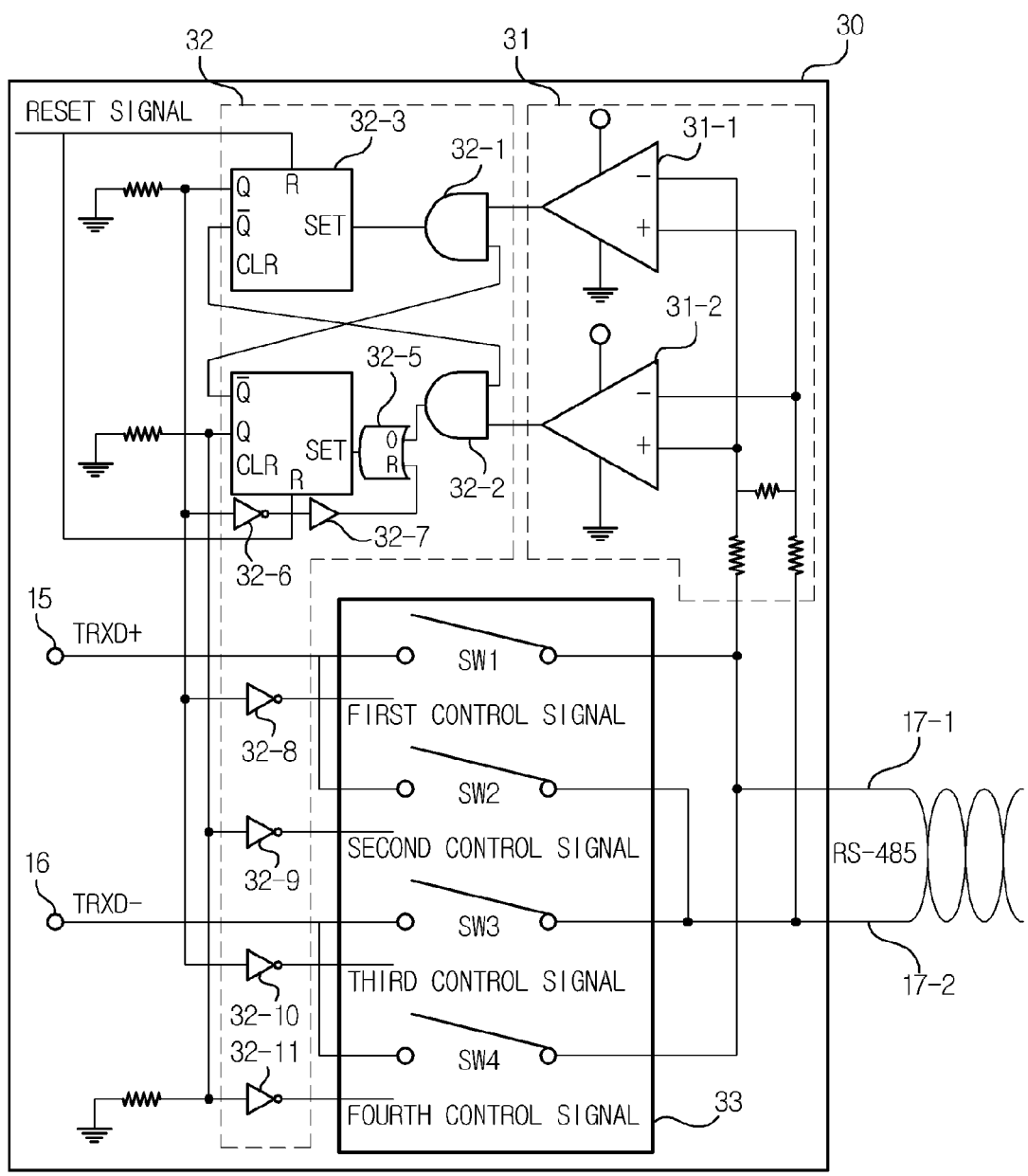
FIG. 4 is a block diagram illustrating a detailed circuit configuration of the apparatus of FIG. 3.

FIG. 4 is a block diagram illustrating a detailed circuit configuration of the apparatus of FIG. 3.

Referring to FIG. 4, the comparator (31) may include a first comparator (31-1) and a second comparator (31-2), where the first comparator (31-1) receives a voltage of the first signal line (17-1) and a voltage of the second signal line (17-2) via a minus input terminal and a plus input terminal respectively, and the second comparator (31-2) receives a voltage of the first signal line (17-1) and a voltage of the second signal line (17-2) via a plus input terminal and a minus input terminal respectively.

Thus, the first comparator (31-1) outputs a high signal when the voltage of the second signal line (17-2) is higher than that of the first signal line (17-1), and the second comparator (31-2) outputs a low signal when the voltage of the first signal line (17-1) is higher than that of the second signal line (17-2). Resistor elements may be interposed between each input terminal of the comparators (31-1, 31-2) and each signal lines (17-1, 17-2) for stable operation.

The switch controller (32) may include a first AND element (32-1), a second AND element (32-2), a first D flip flop (32-3), a second D flip flop (32-4), and an OR element (32-5).

Two input terminals of the first AND element (32-1) are respectively connected to an output terminal of the first comparator (31-1) and to a Q' terminal of the second D flip flop (32-4), two input terminals of the second AND element (32-2) are respectively connected to an output terminal of the second comparator (31-2) and to a Q' terminal of the first D flip flop (32-3).

A reset signal from a host (e.g., MPU) is inputted to a RESET terminal of the first D flip flop (32-3), and to a RESET terminal of the second D flip flop (32-4). A SET terminal of the first D flip flop (32-3) is connected to an output terminal of the first AND element (32-1), and a SET terminal of the second D flip flop (32-4) is connected to an output terminal of the OR element (32-5).

The OR element (32-5) receives an output signal of the second AND element (32-2) and a Q terminal signal-inversed signal of the first D flip flop (32-3). To this end, a Q terminal signal of the first D flip flop (32-3) in inputted to the OR element (32-5) via an inverter (32-6) and a buffer (32-7).

Due to this configuration, the Q terminal signal of the first D flip flop (32-3) and the Q terminal signal of the second D flip flop (32-4) cannot be same, and a switch control signal is generated by using the Q terminal signal of the first D flip flop (32-3)) and the Q terminal signal of the second D flip flop (32-4).

The switch control signal, as illustrated in FIG. 4, transmits to the switch unit (3), a first control signal {a signal inverted from the Q terminal signal of the first D flip flop (32-3) via an inverter (32-8)}, a second control signal {a signal inverted from the Q terminal signal of the second D flip flop (32-4) via an inverter (32-9)}, a third control signal {a signal inverted from the Q terminal signal of the first D flip flop (32-3) via an inverter (32-10)}, and a fourth control signal {a signal inverted from the Q terminal signal of the second D flip flop (32-4) via an inverter (32-11)}.

The switch unit (33) includes first, second, third and fourth switches (SW1, SW2, SW3, SW4), where each switch (SW1~SW4) is turned on when a control signal corresponding to itself is high, and each switch (SW1~SW4) is turned off when a control signal corresponding to itself is low.

The first switch (SW1) switches between the TRXD+ terminal (15) and the first signal line (17-1) to receive a first control signal. That is, the TRXD+ terminal (15) and the first signal line (17-1) are connected. when the Q terminal signal of the first D flip flop (32-3) is low.

The second switch (SW2) switches between the TRXD+ terminal (15) and the second signal line (17-2) to receive a second control signal. That is, the TRXD+ terminal (15) and the second signal line (17-2) are connected, when the Q terminal signal of the second D flip flop (32-4) is low.

The third switch (SW3) switches between the TRXD− terminal (16) and the second signal line (17-2) to receive a third control signal. That is, the TRXD− terminal (16) and the second signal line (17-2) are connected, when the Q terminal signal of the first D flip flop (32-3) is low.

The fourth switch (SW4) switches between the TRXD− terminal (16) and the first signal line (17-1) to receive a fourth control signal. That is, the TRXD− terminal (16) and the first signal line (17-1) are connected, when the Q terminal signal of the second D flip flop (32-4) is low.

After all, the TRXD+ terminal (15) and the first signal line (17-1) are connected and the TRXD− terminal (16) and the second signal line (17-2) are connected when the Q terminal signal of the first D flip flop (32-3) is low. Furthermore, the TRXD+ terminal (15) and the second signal line (17-2) are connected, and the TRXD− terminal (16) and the first signal line (17-1) are connected when the Q terminal signal of the second D flip flop (32-4) is low. These switches (33) may be configured using a switch IC (Integrated Circuit).

Figure 5:
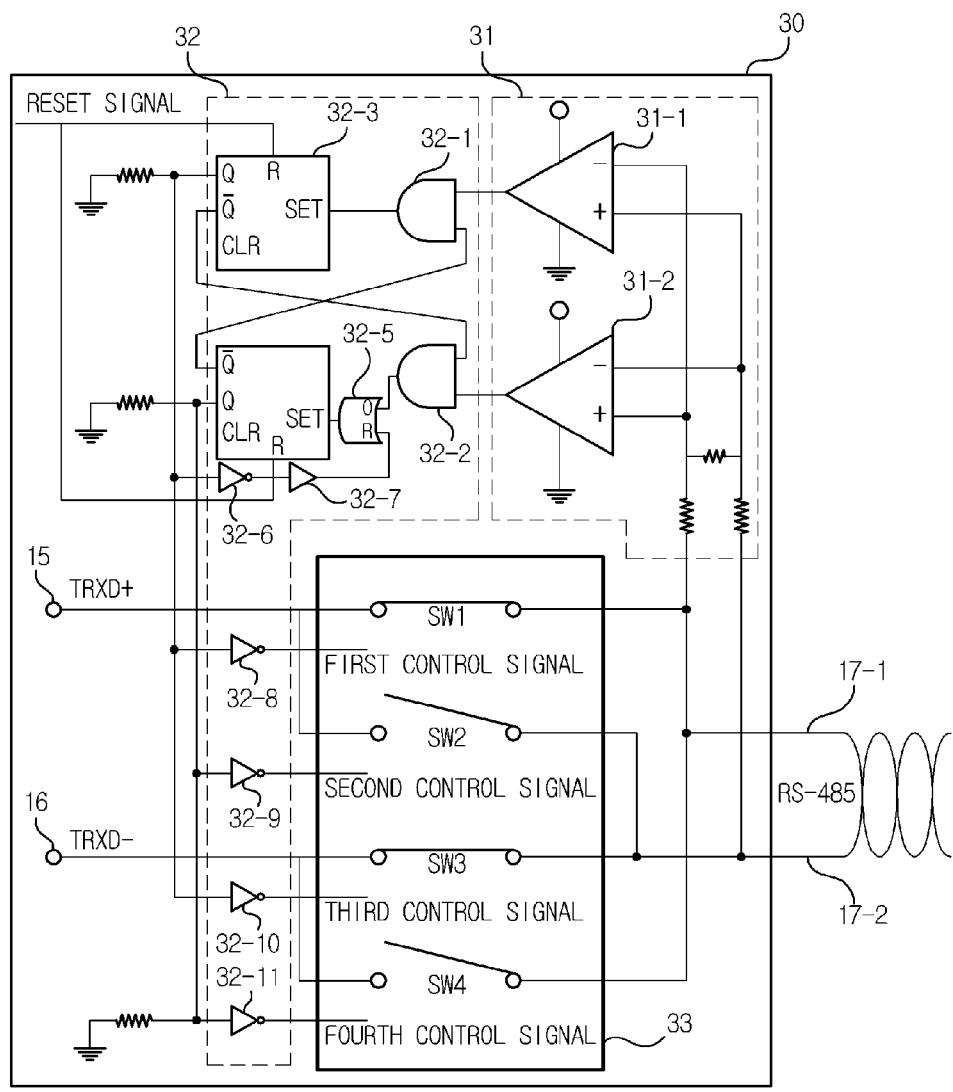
FIG. 5 is a block diagram illustrating a switch connection configuration when a device operates as a master in the circuit configuration of FIG. 4.

Now, referring to FIG. 5, an example will be explained where the apparatus (30) is applied to a master device.

When a device using the RS-485 communication is a master, the terminal polarity is determined ahead of a slave device, and when the master device is started, a reset signal is transmitted to the first and second D flip flops (32-3, 32-4) for reset the first and second D flip flops (32-3, 32-4).

When the first and second D flip flops (32-3, 32-4) are reset, although the Q terminals of each D flip flop all output a low signal, the low signal outputted from the Q terminal of the first D flip flop (32-3) is inversed via an inverter (32-6), and inputted to a SET terminal of the second D flip flop (32-4) via the OR element (32-5), such that the Q terminal of the second flip flop (32-4) is immediately converted to a high signal. That is, four switches are prevented from being all operated.

When the Q terminal signal of the first D flip flop (32-3) is low, and the Q terminal signal of the second flip flop (32-4) is high, the first switch (SW1) and the third switch (SW3) are short-circuited, whereby the TRXD+ terminal (15) and the first signal line (17-1) are connected, and the TRXD− terminal (16) and the second signal line (17-2) are connected under an initial state where the reset is generated.

Figure 6:
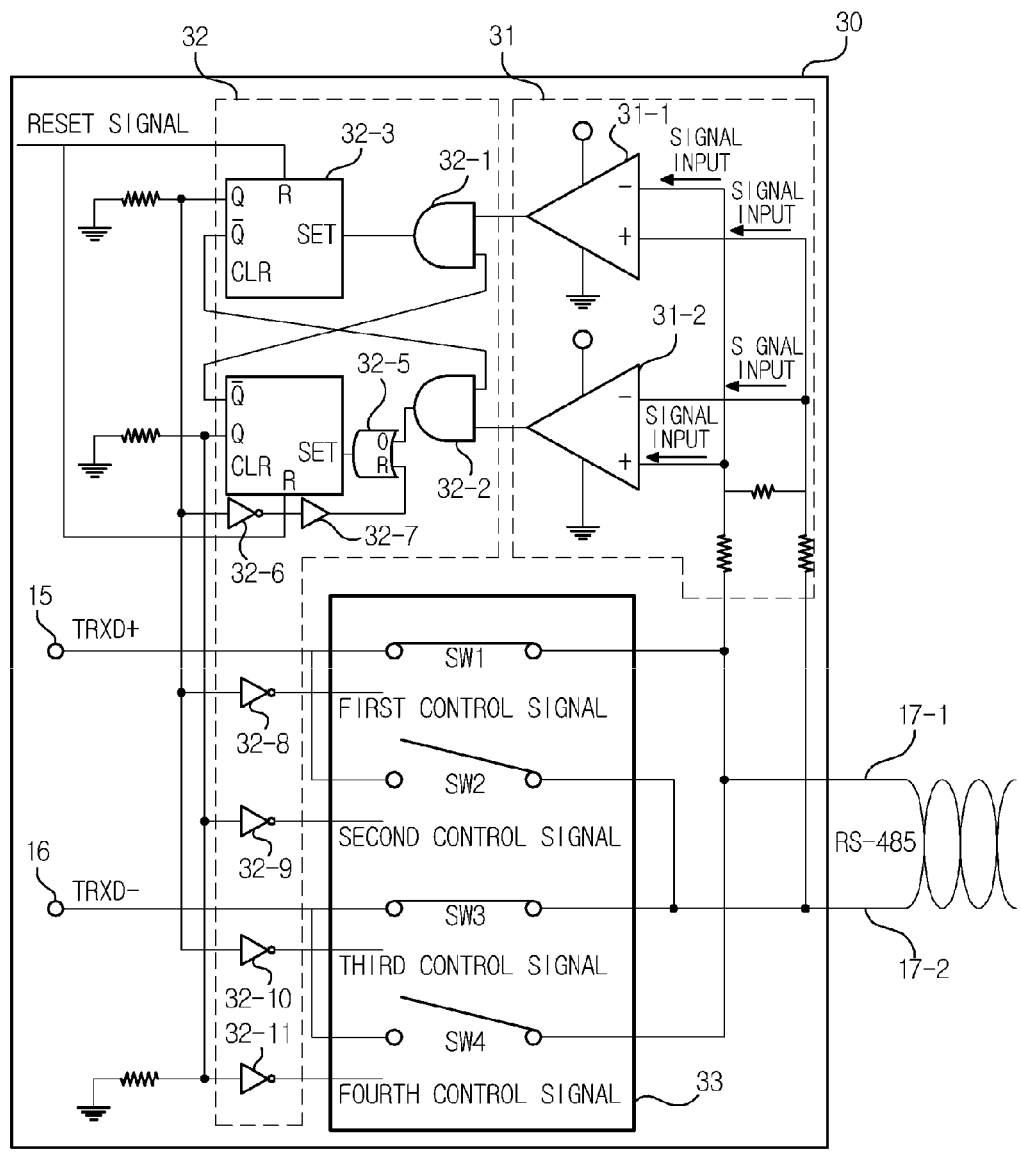
FIGS. 6 and 7 are block diagrams illustrating a switch connection configuration when a device operates as a slave in the circuit configuration of FIG. 4.

Now, referring to FIG. 6, an example will be explained where the apparatus (30) is applied to a slave device.

When a device using the RS-485 communication is a slave, the relevant device waits for a signal transmitted from a master. The slave device is not reset at an initial operation, and when two signals with unknown polarities are received from the communication cable (17), the comparator (31) compares a difference between voltage levels of two signals.

For example, a signal of the first signal line (17-1) is a TRXD+ signal, a start bit of data transmitted by the master device is such that a voltage of the TRXD+ signal is higher than a voltage of the TRXD− signal, and therefore, the first comparator (31-1) outputs a low signal while the second comparator (31-2) outputs a high signal.

As a result, the Q terminal of the first D flip flop (32-3) outputs a low signal, and the Q terminal of the second D flip flop (32-4) outputs a high signal, whereby the first switch (SW1) and the third switch (SW3) are controlled to be in a short-circuited state to allow the TRXD+ terminal (15) and the first signal line (17-1) to be connected, and the TRXD− terminal (16) and the second signal line (17-2) to be connected. The first D flip flop (32-3) and the second D flip flop (32-4) maintain a switch-connected state until a power of the device is turned off or a reset signal is inputted.

Figure 7:
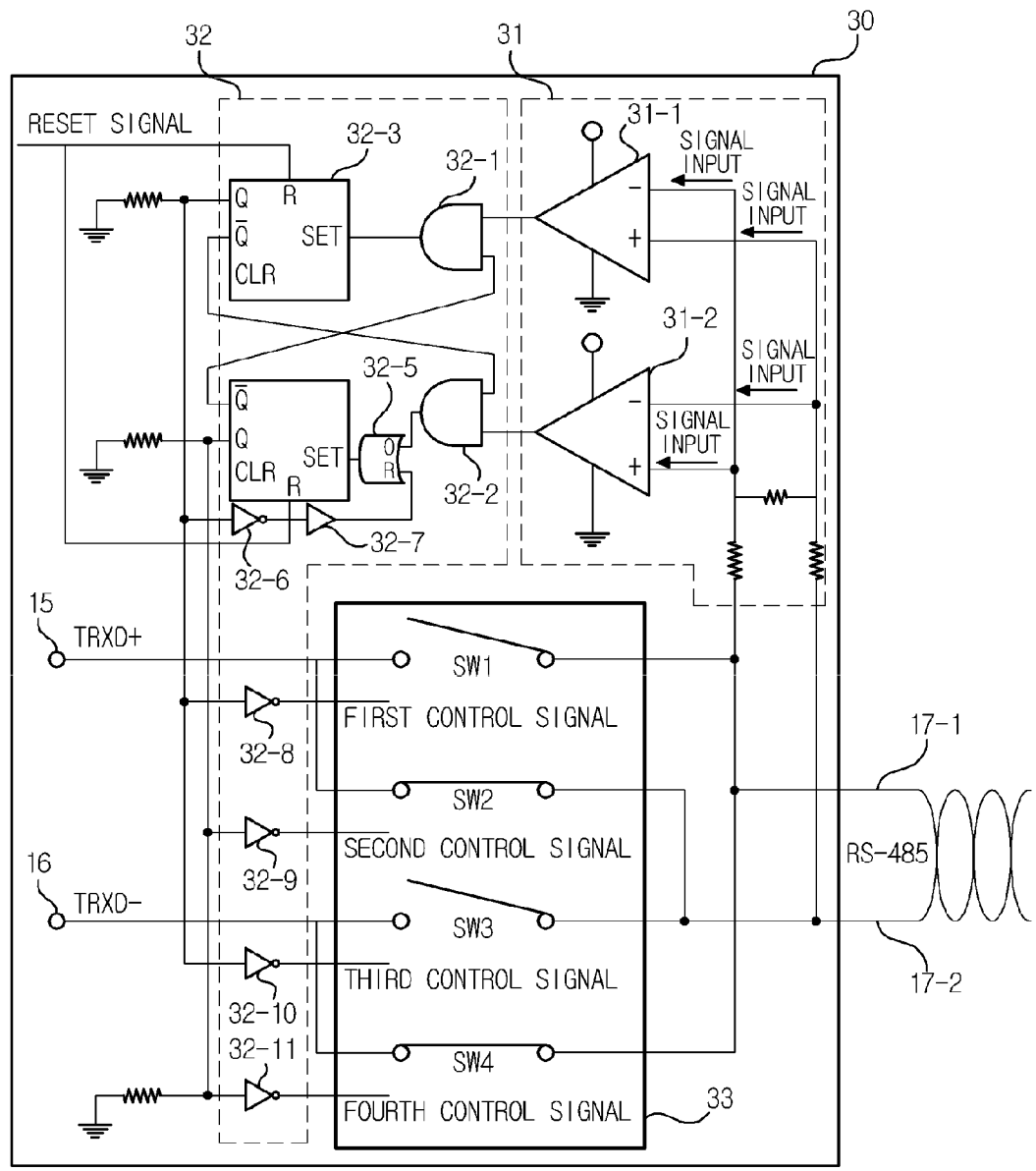

Now, referring to FIG. 7, another example (when a signal of the second signal line is a TRXD+ signal) will be explained where the apparatus (30) is applied to a slave device.

When two signals with unknown polarities are received from the communication cable (17), the comparator (31) compares a difference between voltage levels of two signals.

Because a start bit of data transmitted by the master device is such that a voltage of the TRXD+ signal is higher than a voltage of the TRXD− signal, the first comparator (31-1) outputs a high signal while the second comparator (31-2) outputs a low signal. As a result, the Q terminal of the first D flip flop (32-3) outputs a high signal, and the Q terminal of the second D flip flop (32-4) outputs a low signal, whereby the second switch (SW2) and the fourth switch (SW4) are controlled to be in a short-circuited state to allow the TRXD+ terminal (15) and the second signal line (17-2) to be connected, and the TRXD− terminal (16) and the first signal line (17-1) to be connected. That is, each of the TRXD+ terminal (15) and the TRXD− terminal (16) is matchingly connected to a signal line of correct polarity, regardless of polarities of signal lines.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An apparatus for converting terminal polarity for RS communication, the apparatus comprising:
   a comparator configured to discriminate polarities of a first signal line and a second signal line of a cable for RS-485 communication by comparing voltage levels indicated on the first and second signal lines;
   a switch controller configured to transmit a switch control signal in response to the polarity discrimination by the comparator;
   a switch unit configured to connect a TRXD+ terminal to the first signal line and connect a TRXD− terminal to the second signal line, to connect a TRXD+ terminal to the second signal line or to connect a TRXD− terminal to the first signal line in response to the switch control signal,
   wherein the comparator comprises:
      a first comparator configured to receive a voltage of the first signal line via a minus input terminal and receive a voltage of the second signal line via a plus input terminal in order to discriminate the polarities of the first and second signal lines and to output a first result signal; and
      a second comparator configured to receive a voltage of the first signal line via a plus input terminal and receive a voltage of the second signal line via a minus input terminal in order to discriminate the polarities of the first and second signal lines and to output a second result signal,
   wherein the first result signal is high when the voltage of the second signal line is greater than the voltage of the first signal line, and
   wherein the second result signal is low when the voltage of the first signal line is greater than the voltage of the second signal line.

2. The apparatus of claim 1, wherein:
   the switch unit comprises a first D flip flop, a second D flip flop, a first AND element, a second AND element and an OR element;
   two input terminals of the first AND element are each connected to an output terminal of the first comparator or a Q' terminal of the second D flip flop;
   two input terminals of the second AND element are each connected to an output terminal of the second comparator or a Q' terminal of the first D flip flop;
   a reset signal from a host is input to a RESET terminal of the first D flip flop;
   a SET terminal is connected to an output terminal of the first AND element;
   a reset signal from the host is input to a RESET terminal of the second D flip flop;
   a SET terminal is connected to an output terminal of the OR element;
   an output signal of the second AND element and a Q terminal signal-inversed signal of the first D flip flop are each input to one of two input terminals of the OR element; and
   the switch control signal is generated by using a Q terminal signal of the first D flip flop and a Q terminal signal of the second D flip flop.

3. The apparatus of claim 2, wherein the switch unit further comprises:
   a first switch configured to connect the TRXD+ terminal to or disconnect the TRXD+ terminal from the first signal line
   a second switch unit configured to connect the TRXD+ terminal to or disconnect the TRXD+ terminal from the second signal line;
   a third switch configured to connect the TRXD− terminal to or disconnect the TRXD− terminal from the second signal line; and
   a fourth switch unit configured to connect the TRXD− terminal to or disconnect the TRXD− terminal from the first signal line.

4. The apparatus of claim 3, wherein:
   the first, second, third and fourth switch units are turned on when the switch control signal is high; and
   the first, second, third and fourth switch units are turned off when the switch control signal is low.

5. The apparatus of claim 3, wherein the switch controller is further configured to:
   reverse the Q terminal signal of the first D flip flop for transmission as control signals of the first switch; and
   reverse the Q terminal signal of the second D flip flop for transmission as control signals of the second switch and the fourth switch.

* * * * *